United States Patent
Buchler et al.

(10) Patent No.: US 6,175,807 B1
(45) Date of Patent: Jan. 16, 2001

(54) TEMPERATURE COMPENSATION METHOD FOR STRAPDOWN INERTIAL NAVIGATION SYSTEMS

(75) Inventors: Robert J. Buchler, Calabassas; Larry R. Moeller; Shaw-Wen Fann, both of Woodland Hills; Daniel A. Tazartes, West Hills; John G. Mark, Pasadena, all of CA (US)

(73) Assignee: Litton Systems, Inc., Woodland Hills, CA (US)

(*) Notice: Under 35 U.S.C. 154(b), the term of this patent shall be extended for 0 days.

(21) Appl. No.: 09/329,094

(22) Filed: Jun. 9, 1999

(51) Int. Cl.[7] .................................................. G01C 21/00
(52) U.S. Cl. ............................................................ 701/220
(58) Field of Search ................................... 701/220, 216; 342/357.13, 357.14

(56) References Cited

U.S. PATENT DOCUMENTS

| 4,303,978 | * | 12/1981 | Shaw et al. ........................... 701/220 |
| 4,675,820 | * | 6/1987 | Smith et al. ........................... 701/220 |
| 5,527,003 | * | 6/1996 | Diesel et al. ........................... 701/220 |
| 5,570,304 | * | 10/1996 | Mark et al. ........................... 701/220 |

OTHER PUBLICATIONS

Neil Dahlen et al, "Tightly–Coupled IFOG–Based GGP Implementation and Field Test Results", IEEE, Apr. 1996, pp. 213–221.*

* cited by examiner

Primary Examiner—Gregory C. Issing
(74) Attorney, Agent, or Firm—Robert E. Malm

(57) ABSTRACT

The invention is a method continuing over a plurality of time periods for compensating for the output error in each of one or more navigation instruments in a system comprising a plurality of navigation instruments after the system is introduced into its operating environment. The practice of the method begins with determining the values of one or more of a set of coordinates that specify the position, velocity, and orientation of the system in space together with the error in a compensated output for each of the one or more navigation instruments. The method continues with determining a compensation model for each of the one or more navigation instruments. A compensation model specifies for a current time period an adjustment in amplitude of the output of a navigation instrument as a function of time and temperature. A compensation model is expressed as the sum of a first compensation model and a present second compensation model where the present second compensation model is a future second compensation model determined during the prior time period. The final steps of the method consist of measuring the time and the temperature of the navigation instruments and then obtaining a compensated output for each of the one or more navigation instruments by adjusting the output of a navigation instrument in accordance with its compensation model.

45 Claims, 1 Drawing Sheet

TEMPERATURE COMPENSATION METHOD FOR STRAPDOWN INERTIAL NAVIGATION SYSTEMS

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to strapdown inertial navigation systems and more specifically to continuous temperature compensation methods.

In previous generations of inertial navigation systems, gimbaled platforms were used to spatially stabilize the accelerometers and thereby provide a coordinate system in which velocity and position could be propagated. The advantage of the gimbaled systems was the isolation of the instruments from large angular motions, the cancellation of errors in many scenarios, and the ability to re-calibrate the instruments by using simple gimbal rotations. The advent of strapdown instruments such as laser gyroscopes and high-speed computers has rendered the platform systems obsolete. Strapdown systems offer a high degree of ruggedness, unsurpassed reliability, wide-bandwidth capabilities, and multi-function capabilities. A typical strapdown ZLG system has an MTBF an order of magnitude higher than a platform system of old while providing equal or better performance and enhanced capabilities. Unfortunately, the strapdown systems are at a disadvantage from the point of view of continuous calibration. While gimbaled systems could self-calibrate with commanded gimbal rotations, such possibilities were non-existent in the strapdown, gimbal-free systems. Furthermore, while platform systems were generally temperature controlled, modern strapdown systems operate at the ambient temperature and employ thermal models to compensate for instrument temperature sensitivity. For systems with extremely long field longevity such as the ZLG-based units, a continuous calibration method is highly desirable in order to track any potential aging effects and to guarantee superior navigation accuracy over the life of the unit.

BRIEF SUMMARY OF THE INVENTION

The invention is a method for continuously compensating for the output error in each of one or more navigation instruments in a system comprising a plurality of navigation instruments after the system is introduced into its operating environment. The method is predicated on the system operating for a plurality of time periods and occasionally being subjected to specified types of motion and occasionally being supplied with data by other navigation data sources. The method is a way of compensating during a time period for the output error in each of the one or more navigation instruments as a function of temperature based on measurements obtained in one or more prior time periods.

The practice of the method begins with determining the values of one or more of a set of coordinates that specify the position, velocity, and orientation of the system in space together with the error in a compensated output for each of the one or more navigation instruments. The method continues with determining a compensation model for each of the one or more navigation instruments. A compensation model specifies for a current time period an adjustment in amplitude of the output of a navigation instrument as a function of time and temperature. A compensation model is expressed as the sum of a first compensation model and a present second compensation model where the present second compensation model is a future second compensation model determined during the prior time period. The final steps of the method consist of measuring the time and the temperature of the navigation instruments and then obtaining a compensated output for each of the one or more navigation instruments by adjusting the output of a navigation instrument in accordance with its compensation model.

DETAILED DESCRIPTION OF THE INVENTION

Figure 1:
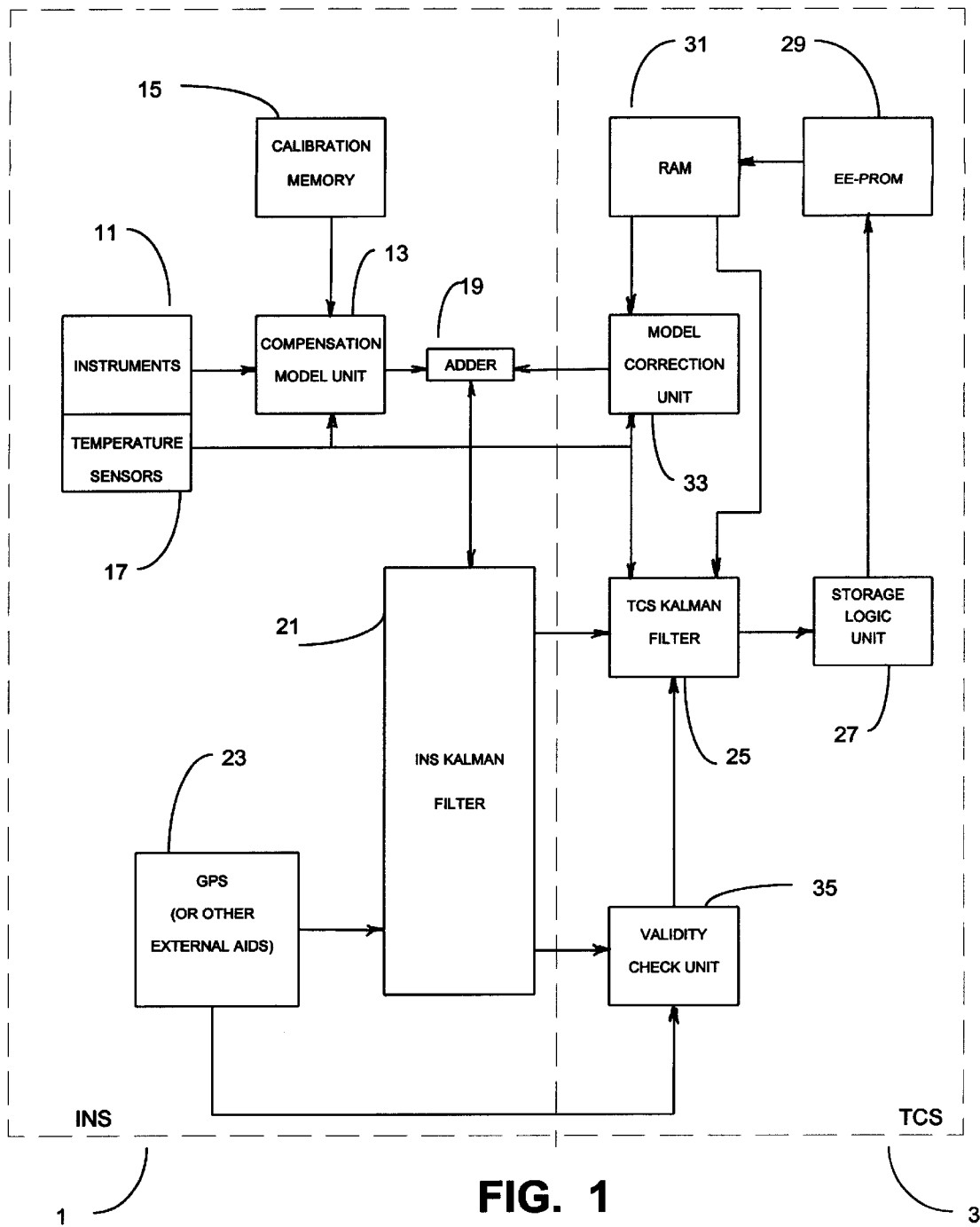
FIG. 1 is a block diagram of the temperature compensation system.

The invention is a temperature compensation system (TCS) for strapdown inertial navigation systems. The TCS provides continuous automated compensation for long-term aging effects in the instruments and electronics of strapdown systems by taking advantage of external high-precision aiding sources, when available, to fine-tune bias temperature compensation models without disturbing the current free-inertial solution. This approach ensures excellent integrity (i.e. model updates can be judged for validity) while providing model tracking for improved free-inertial performance in future flights. Analyses and simulations demonstrate the effectiveness of the TCS in maintaining and improving free-inertial navigation performance over many years of operation.

While the benefit of an inertial navigation system (INS) is its ability to operate without relying on external inputs, it is recognized that many navigation aids (GPS in particular, but also others such as Doppler, etc.) can be used to enhance the performance of the system when they are available.

The TCS approach is based on the availability of extended ground alignment or precision GPS to aid in the continuous calibration of the INS instruments. When precision inputs are available, the INS Kalman filter estimates instrument errors. These are normally applied only to the hybrid (aided inertial) solution, thereby avoiding contamination of the free-inertial solution, but this approach also results in the propagation of instrument errors and the degradation of the free-inertial solution.

In the TCS, the INS Kalman filter is used to obtain estimates of instrument bias errors. The Kalman filter in the TCS estimates a number of parameters associated with the temperature-dependent calibration model of the instruments. These model parameters can be updated in later flights (once the data has been deemed valid). The result is a temperature compensation model which is automatically updated to track long-term drifts or aging of the calibration data.

In implementing a TCS, it should be noted that gyro bias errors are the dominant cause of navigation errors. While a TCS mechanization may include other error sources, it may be desirable, in order to minimize TCS Kalman filter complexity, to include only the level-axis gyro bias errors.

The TCS Kalman filter operates on the gyro bias estimates provided by the INS Kalman filter as well as on measurements of temperature. The TCS Kalman filter states include bias offset, bias linear temperature sensitivity and several temperature dependent local biases. These states are propagated according to models of drift or aging of the gyro bias calibration models. In order to avoid contamination of the free-inertial solution, the TCS Kalman filter operates open-loop (i.e. state variable estimates are made and propagated but not applied). However, the state variables are available as corrections to the gyro bias calibration models to be applied in later flights.

Reasonableness tests on external data (principally GPS), state variable estimates, and Kalman filter covariances are made to ensure that corrupted data will not be used to update the gyro bias temperature compensation model. If the determination is made that the aiding data was valid and all ambiguities resolved, the TCS software saves the state variable estimates in non-volatile memory for use in later flights. This ensures that a free-inertial solution will be available for each flight while at the same time taking advantage of the self-calibrating potential of an INS-GPS combination.

Because the TCS utilizes observations in the actual thermal environment that the system experiences during flight, it has the added advantage of fine-tuning the system calibration for its actual environment. This is a superior approach to self-calibration of platform systems which must usually be done on the ground and not in a flight environment.

Extensive analyses and simulations of a TCS mechanization have been performed in a variety of flight and environmental scenarios. Both the INS Kalman filter and the TCS Kalman filter were included. Results indicate a substantial benefit in terms of long term system performance thereby ensuring excellent field longevity. The results show TCS tracking calibration model aging to the 0.002–0.003°/hr level.

A block diagram of an INS 1 and a TCS 3 is shown in FIG. 1. The outputs of the INS instruments 11 comprising gyros and accelerometers feed into the compensation model unit 13 which applies corrections to the outputs in accordance with a compensation model. The x and y axes of the instrument reference frame are nominally-level axes. The values for the compensation model parameters are stored in a non-volatile portion (typically an EE PROM) of the calibration memory 15. Intimately associated with the instruments I1 are temperature sensors 17 which feed instrument temperature values into the compensation model unit 13. The compensated instrument outputs from the compensation model unit 13 may be corrected in passing through adder 19 and into the INS Kalman filter 21. Navigation data from external sources 23 (e.g. a GPS receiver) may also feed into the INS Kalman filter 21.

The instruments 11 are exemplified by the LN-100 IMU (inertial measurement unit) manufactured by Litton Guidance & Control Systems. The TCS's features can be best understood in the context of the present process for calibrating the LN-100.

After a complete laboratory calibration of a particular LN-100 IMU, temperature-related parameters obtained from the laboratory calibration are loaded into the EE-PROM portion of the calibration memory 15. The data in EE-PROM is retained even after power turn-off.

During normal system operation, upon subsequent turn-on, the INS operational program copies EE-PROM into a RAM portion of calibration memory 15 and then proceeds to use the RAM copy during the current mission. The current mission includes turn-on, alignment, taxi, takeoff, flight, landing, taxi, possibly additional takeoffs and landings, and powerdown.

The EE-PROM holds the following data:
(1) Coefficients for a fifth-order gyro bias polynomial:
Six coefficients are used to define a fifth-order polynomial POLY(T) vs. temperature. This polynomial is used to compute gyro bias at any temperature within the required operating temperature range (typically −40° C. to +85° C.). A different set of coefficients is used for each of the x-, y-, and z-gyros. The zero-order coefficient, which has the units degrees/hour, is called a0. The first order coefficient, which has the units degrees/hour/° C., is called a1.
(2) Fine tuning of gyro bias by means of a spline:
The entire temperature range is divided into intervals of 5° C. The temperature at the lower temperature end of each interval is called a "bin". Associated with each bin are two coefficients: the local gyro bias value (in degrees/hour) and the local gyro bias rate vs. temperature (in degrees/hour/° C.). A cubic polynomial involving 4 coefficients over each 5° C. interval is defined using the 2 coefficients from the starting bin and the 2 coefficients from the ending bin 5° C. away. The final result is a spline function SPLINE(T) of temperature T over the entire temperature range.
(3) Accelerometer bias and accelerometer scale factor:
Six coefficients for a fifth-order polynomial vs. temperature are saved for the bias of each of the x-, y-, and z-accelerometers and for the scale factor of each of the x-, y-, and z-accelerometers. There is no accelerometer spline.
(4) Fine tuning of a0:
A final adjustment to the a0 terms is performed as part of the laboratory calibration. However, the desired change is placed in a new variable called "minibias". There is a separate minibias for each of the x-, y-, and z-gyro biases, for each of the x-, y-, and z-accelerometer biases, and for each of the x-, y-, and z-accelerometer scale factors. The INS operational program uses the sum of a0 and minibias as the effective total a0.
(5) Instrument misalignments:
Six coefficients for a fifth-order polynomial vs. temperature are saved for each misalignment term. There is no misalignment spline or minibias.
(6) Other gyro control related terms.

Provision is made to allow the INS operational program to further alter, under certain conditions, certain parameters contained in the EE-PROM during normal system operation. In general, the minibias values contained in the EE-PROM may be altered when the operational program determines it has obtained sufficient real-time measurements from sources such as Zero Velocity updates (ZUPT), Pseudo Doppler Quality (PDQ) updates, or Global Positioning System (GPS) updates to reliably estimate the current residual instrument errors. The EE-PROM parameters which may be altered by the operational program are x-, y-, and z-gyro bias minibiases, x-, y-, and z-accelerometer bias minibiases, and x-, y-, and z-accelerometer scale factor minibiases.

During subsequent turn-ons, the INS operational program reads out the original calibration data including the original a0, and the current minibias from the EE-PROM for use as the best estimate of instrument errors. The INS operational program uses the sum of minibias and a0 as the effective a0. If ZUPTs, PDQ, or GPS are available, the INS Kalman filter 21 x- and y-gyro bias state variables $b\_xK$ and $b\_yK$ provide estimates of the residual gyro biases. Theses residual biases are applied during the flight to the navigation solution.

At shut-down and at various other specified times, a portion of the $b\_xK$ and $b\_yK$ is added to the associated current EE-PROM minibias and restored in the EE-PROM minibias as an updated minibias. Since this correction is applied to EE-PROM, it does not affect performance of the current mission because the current mission is using a RAM copy of EE-PROM values that existed at the turn-on of this mission.

Rules are specified defining the conditions under which the EE-PROM minibiases may be altered, and rules are also specified as to what percent of the INS Kalman filter 21 measured residual biases shall be used to change the minibiases.

The present minibias scheme does not update the gyro bias local spline bins or any polynomial coefficients of order one or higher. Note that the zero-order coefficient a0, though technically not changed by the operational program, is effectively changed by altering the minibias.

In summary, at turn-on the INS operational program initializes RAM with coefficients for the spline, coefficients for the polynomial, and minibias and clears the b_xK and b_yK registers. After initialization, the INS operational program uses b_xNAV and b_yNAV as the total estimated gyro bias where b_xNAV=MINI_x+SPLINE_x+POLY_x+b_xK and b_yNAV=MINI_y+SPLINE_y+POLY_y+b_yK and where MINI_x is the x minibias, SPLINE_x is the x spline function using spline coefficients, POLY_x is the x polynomial function using polynomial coefficients, and b_xK is the INS Kalman filter 21 estimate of x-gyro bias error. Similarly, MINI_y is the y minibias, SPLINE_y is the y spline function using spline coefficients, POLY_y is the y polynomial function using polynomial coefficients, and b_yK is the INS Kalman filter 21 estimate of y-gyro bias error.

Observations using ZUPTs, PDQ, or GPS cause the INS Kalman filter 21 to adjust b_xK and b_yK in real time to minimize observation errors. The value of MINI does not change in real time. The quantities SPLINE and POLY are functions of the current temperature T which will in general change with time. However, the coefficients used in these functions are constants.

At certain specified times, portions of b_xK and b_yK are used to increment respectively the EE-PROM x- and y-gyro minibiases. Other INS Kalman filter 21 values alter the EE-PROM z-gyro bias, the x-, y-, and z-accelerometer biases, and the x-, y-, and z-accelerometer scale factors. The changes to EE-PROM stored values will affect the next flight but not the current flight.

The TCS 3 utilizes an algorithm which estimates time and temperature-dependent gyro bias sensitivities during normal non-temperature-controlled inertial system operation when external measurements such as zero velocity updates ZUPTs, cross-body taxi null velocity observations (PDQ), and precision GPS are available in order to enhance INS performance during subsequent free-inertial flights.

The INS Kalman filter 21 estimates total current gyro bias errors. The TCS 3 algorithm allocates these bias errors to their more fundamental cause: gyro bias trending over time and trending differently at different temperatures. The result is a gyro temperature compensation model which updates and tracks long-term drifts of the gyro calibration data, thus enhancing subsequent free-inertial system performance. For robustness, the enhancement obtained on a given flight is only applied on subsequent flights.

The TCS 3 utilizes the TCS Kalman filter 25 to obtain the gyro temperature compensation model. The gyro temperature compensation model is corrected using in-flight measurements as opposed to before or after flight measurements. The TCS gyro temperature compensation model is detailed, containing estimates of a global zero order and first order bias coefficient for a straight line fit, the time rate of change of these two coefficients, and 19 local (within ±3° C.) bias bin adjustments over a 54° C. temperature range.

The TCS 3 maintains 46 calibration values (called old model vector X) to be applied to the navigation solution during the current flight and thus affecting the INS Kalman filter observations. These values represent the accumulation of all TCS 3 updates from all previous missions. These values change with time during the current flight because the old model vector X are mechanized with a 10-day correlation time. At shut-down, the most current values of X is saved in non-volatile memory. During the flight, if new observations are made available to the is TCS Kalman filter 25 because the INS Kalman filter 21 is using current observations (ZUPTs, GPS, etc), any new changes to the model vector during the current flight are applied to another set of 46 calibration values (called new model vector X_n) which are also saved in non-volatile memory at shut-down, along with TCS Kalman filter 25 covariances representing the statistical errors in X_n. At the next turn-on X and X_n are recalled and combined, X_n is zeroed, and the new X is used for this flight and saved in non-volatile memory after turn-on initialization is complete.

The TCS Kalman filter 25 obtains its inputs from the INS Kalman filter 21. Both Kalman filters could be included in the INS operational program which provides overall control of the INS/TCS apparatus. The INS Kalman filter 21 observes ZUPTs, PDQ measurements, and precision GPS to estimate current states including instrument error state variables, which include x- and y-gyro bias state variables. In general these state variables are non-zero indicating some error in the present gyro calibration, possibly at certain temperatures. The INS Kalman filter 21 has no mechanism for readjusting the underlying gyro temperature model. The TCS Kalman filter 25 input observations are two of the INS Kalman filter 21 state variables x- and y-gyro biases. The TCS Kalman filter 25, containing 46 of its own state variables (model vector components), passes these measurements through a TCS temperature-dependent observation matrix to optimally estimate corrections to the x- and y-gyro temperature compensation model.

The TCS gyro temperature compensation model contains states for global (all temperature) bias a0, a global ramp with temperature a1, the time rate-of-change of a0 and a1, and 19 local bias model vector components representing temperature regions (bins) of width 3° C. covering an operational temperature range of 0° C. to 54° C. for a total of 23 model vector components for the x axis. Another 23 model vector components are used for the y axis. Model vector components could also be allocated for z axis parameters, but are not in the preferred embodiment.

The laboratory calibration data (SPLINE(T)+POLY(T)+MINI) and the INS Kalman filter 21 state variable estimates are still applied by the INS operational program in the integrated INS/TCS. In addition, the INS operational program is altered to also apply additional estimates obtained from the TCS Kalman filter 25.

The TCS Kalman filter 25 provides estimates to the model correction unit 33 of x- and y-gyro bias temperature bin data, a0, a1, and their rates in two model vectors X_x and X_y of 23 elements each. The model correction unit 33 will determine model corrections from the two model vectors X_x and X_y and supply these model corrections to adder 19. The TCS does not in this embodiment alter z-gyro bias or any accelerometer bias or accelerometer scale factor.

The TCS states X_x and X_y are associated with a non-zero dynamics matrix and thus will propagate during a mission. That is, the values in X_x and X_y will change with time even without any updates.

At certain times during a mission X_x and X_y are saved via storage logic unit 27 in non-volatile EE-PROM 29 memory so that at shut-down a fairly recent copy of the latest RAM values of X_x and X_y are already stored in EE-PROM 29.

At turn-on for the next mission, the EE-PROM 29 values of X_x and X_y are copied to RAM 31 memory, and the RAM 31 values are subsequently used by model correction unit 33 to develop corrections which are added to the outputs from the compensation model unit 13 in adder 19.

TCS Kalman filter 25 updates do not alter the values of X_x and X_y being used by the INS operational program for the current flight, but are applied to separate states X_nx and X_ny, the values of which are stored in TCS Kalman filter 25 RAM together with the values of X_x and X_y. The values X_nx and X_ny are also saved at certain times in EE-PROM 29. If TCS Kalman filter 25 updates have occurred during the mission, X_nx and X_ny stored in TCS Kalman filter 25 RAM and in EE-PROM memory 29 will be non-zero but will not have been used by the INS operational program during the current mission. The goal is to use them, in addition to X_x and X_y, for the NEXT mission and this goal is accomplished as follows. After shut-down and subsequent turn-on, corresponding EE-PROM 29 values of X_x and X_y and of X_nx and X_ny are added and stored in TCS Kalman filter 25 RAM as X_x and X_y. The X_nx and X_ny registers in TCS Kalman filter 25 RAM are cleared, and the new values of X_x and X_y and X_nx and X_ny are copied into EE-PROM 29. Thus, the new mission will now have been upgraded to use the previous mission's X_nx and X_ny. Note that 100% of X_nx and X_ny are added (as opposed to a lesser percent common in most minibias schemes). The reason for 100% is that the TCS Kalman filter 25 updates have already weighted the corrections to X_nx and X_ny as a result of the Kalman filter process.

In summary, at turn-on, the INS operational program initializes:
coefficients for spline
coefficients for polynomial
minibias
X_x(i), X_y(i) (i=1 to 19) (TCS bin values for this flight);
X_x (20), X_y (20) (TCS a0 value for this flight);
X_x(21), X_y(21) (TCS a1 value for this flight);
X_x(22), X_y(22) (TCS a0 time rate-of-change value for this flight);
X_x(23), X_y(23) (TCS a1 time rate-of-change value for this flight).

The INS operational program clears
b_xK, b_yK (INS Kalman filter states);
X_nx(i), X_ny(i) (i=1 to 23) (TCS Kalman filter states).
TCS Kalman filter covariances are also initialized.

After initialization, the INS operational program propagates X_x and X_y and uses b_xNAV and b_yNAV as the total estimated gyro bias, where $$b\_xNAV=MINI\_x+SPLINE\_x+POLY\_x+b\_xK+b\_xTCS$$

$$b\_yNAV=MINI\_y+SPLINE\_y+POLY\_y+b\_yK+b\_yTCS$$

and
MINI_x, MINI_y is the x and y minibiases;
SPLINE_x, SPLINE_y is the x and y spline functions using spline coefficients;
POLY_x, POLY_y is the x and y polynomial functions using polynomial coefficients;
b_xK, b_yK is the INS Kalman filter estimates of x- and y-gyro bias errors;
b_xTCS, b_yTCS TCS current total x- and y-gyro biases.

The TCS current biases b_xTCS and b_yTCS are functions respectively of the current state (X_x, X_y) and the current temperature T. The function is defined as $$b\_xTCS=H\,X\_x$$

$$b\_yTCS=H\,X\_y$$

where H is the current observation matrix and a function of temperature T. The quantities (X_x, X_y) in combination are the current TCS Kalman filter 25 state vector.

Observations using ZUPTs, PDQ, or GPS adjust b_xK and b_yK in real time to minimize observation errors. The value of MINI does not change in real time. SPLINE AND POLY are functions of the current temperature T which will in general change with time. However, the coefficients used in these functions are constants. The values of X_x and X_y) decay and propagate in real time, and their real-time value, along with current temperature T, is used to compute the total current TCS biases b xTCS and byTCS which change with time.

At certain times a portion of the INS Kalman filter 21 state vector is used to increment the minibias, except for the x- and y-gyro bias terms, in calibration memory 15 EE-PROM.

If no TCS Kalman filter updates occur so that the TCS Kalman filter states X_nx and X_ny remains equal to zero, it is still necessary to store all the TCS Kalman filter covariances (diagonal+lower triangle) and all X_x and X_y values because they have all propagated.

The transition matrix used for X_n is the same as that used to propagate X. For the x axis the 19 bin states, a0-dot and a1-dot are first order Markov with a 10 day time constant. The term "dot" stands for the time derivative of the quantity to which the term is appended. The quantity a0-dot drives a0 and a1-dot drives a1. The model is identical for the y axis. Since the two axes are modeled identically, there is no azimuth error state in the TCS Kalman filter 25. To minimize the actual connection between the x and y axes, TCS Kalman filter 25 updates are allowed only when the INS Kalman filter 21 indicates an azimuth covariance less than 1 arcmin$^2$ has been achieved.

States 1–19, 22, and 23 are first-order Markoff with decay times $\tau$ equal to 10 days. States 20 and 21 are driven by states 22 and 23 respectively. The non-zero elements of the 23×23 dynamics matrix A for the TCS Kalman filter 25 are:
$A(i,i)=-1/\tau$; $\tau=10$ days for i=1–19, 22, 23;$1\tau=$ for i=20–21;
$A(20,22)=1$
$A(21,23)=1$ The elements of the 23×23 transition matrix matrix $\Phi$ for the TCS Kalman filter 25 are approximated by $(I+A\Delta t)$ where I is the unit matrix and $\Delta t$ is the time interval for the propagation of interest. Unless otherwise specified, $\Delta t$ is of the order of 3 minutes scaled in days.

The TCS covariance matrix propagates with time once every 3 minutes, and is corrected at TCS updates (which may occur as often as once every three minutes each axis) using conventional Kalman equations. Since the TCS transition matrix and observation matrix are identical for the x and y axes, the covariance matrix is identical for both, and there is no correlation between the two axes. Hence only one TCS transition matrix, observation matrix, and covariance matrix is mechanized and they are used for both axes.

However, the actual observations, the old states X, and the new states X__n have separate x and y values.

The covariance matrix initialization is performed during the laboratory calibration and is loaded into EE-PROM 29. When the system is in normal operation, these covariances will be changed due to TCS covariance propagation and/or TCS Kalman filter 25 updates. At the end of the mission the new covariances are stored in EE-PROM 29 to be recalled at the start of the next turn-on.

The 23×23 covariance matrix P is initialized to P0:

P0(i,i)=(0.005 deg/hr)$^2$ for i=1 to 19
P0(20,20)=(0.005 deg/hr)$^2$
P0(21,21)=(0.000025 deg/hr/° C.)$^2$
P0(22,22)=(0.005 deg/hr/day)$^2$
P0(23,23)=(0.000025 deg/hr/° C./day)$^2$
All off-diagonals=0

The 1×23 process noise matrix Q is diagonal. The 23 elements are:

Q(i)=2P0(i,i)/τ(deg/hr)$^2$/day for i~1 to 19;
Q(20)=(0.0005 deg/hr)$^2$/day
Q(21)=(0.000025 deg/hr/° C.)$^2$/day
Q(22)=2P0(22,22)/τ(deg/hr/day)$^2$/day
Q(23)=2P0(23,23)/τ(deg/hr/° C./day)$^2$/day The covariance matrix is propagated any time the system is operating, by the standard Kalman matrix equation $$P = \Phi * P * \Phi^t + Q * \Delta t$$

where Δt is approximately 0.00283 days (exactly 180 seconds) and one day is defined as 24 hours and all times are operating times. The symbol * denotes matrix multiplication and $\Phi^t$ denotes the transpose of Φ. Scarce-matrix product logic should be used to take advantage of the very sparse transition matrix Φ. Also, since the P matrix is symmetric, only the diagonal and lower triangle need be computed. The time base used for TCS 3 is operating time which theoretically includes all time from power-on. Thus, the TCS 3 software should be scheduled soon after turn-on, even though no TCS updates will occur this soon, to allow the correct accumulation of operating time and to allow the proper covariance propagation of TCS covariances with operating time.

The INS 1 operating program uses the TCS temperature model values obtained from calibration memory 15 EE-PROM and then propagated. The matrix equation for x-axis propagation is $$X\_ = \Phi X\_x$$

Evaluating Φ gives the explicit equations

X__x(i)=X__x(i)*(1−Δt/τ); i=1 to 19; bias bins decay;
X__x(22)=X__x(22)*(1−Δt/τ); a0-dot decay;
X__x(23)=X__x(23)*(1−Δt/τ); a1-dot decay;
X__x(20)=X__x(20)+X__x(22)*Δt; a0=a0+a0-dot*Δt;
X__x(21)=X__x(21)+X__x(23)*Δt; a1=a1+a1-dot*Δt.

A similar set of equations can be specified for the y axis following the above pattern.

TCS Kalman filter 25 updates are applied to new states X__nx and X__ny rather than existing states X__x and X__y, and the new states are then propagated. The new states X__nx and X__ny start at zero (following TCS turn-on initialization), and are propagated every 180 seconds. Until the states acquire a nonzero value via TCS updates, this propagation will leave all states at a zero value. Each 180 seconds following a TCS propagate a possible TCS update may occur provided certain other criteria are met. If a TCS update occurs the resulting changes are applied to the new states X__nx and X__ny rather than to existing states X__x and X__y. With nonzero values in X__nx and X__ny, the propagation every 3 minutes will further alter X__nx and X__ny.

The matrix equation for x-axis propagation is $$X\_nx = \Phi X\_nx$$

Evaluating Φ gives the explicit equations

X__nx(i)=X__nx(i)*(1−Δt/τ); i=1 to 19; bias bins decay;
X__nx(22)=X__nx(22)*(1−Δt/τ); a0-dot decay;
X__nx(23)=X__nx(23)*(1−Δt/τ); a1-dot decay;
X__nx(20)=X__nx(20)+X__nx(22)*Δt; a0=a0+a0-dot*Δt;
X__nx(21)=X__nx(21)+X__nx(23)*Δt; a1=a1+a1-dot*Δt.

A similar set of equations can be specified for the y axis following the above pattern.

Note above that the X__x and X__y values used by the INS Kalman filter 21 are propagated separately from the X__nx and X__ny states. The X__x and X__y values in general are non-zero because they are initialized at turn-on from calibration memory EE-PROM 29 and represent the current best estimate of bias based upon all past missions. The X__nx and X__ny states, however, are initialized to zero at turn-on and only become non-zero if TCS updates occur this mission since they represent changes (if any) measured by this mission.

The measured bias to be passed to TCS 3 is the INS Kalman filter 21 estimates of state variables x- and y-gyro bias (i.e., b__xK b__yK). The INS operational program uses b__xNAV, b__yNAV as the total estimated gyro bias where $$b\_xNAV = MINI\_x + SPLINE\_x + POLY\_x + b\_xK + b\_xTCS$$

$$b\_yNAV = MINI\_y + SPLINE\_y + POLY\_y + b\_yK + b\_yTCS$$

The INS Kalman filter 21 adjusts b__xK, b__yK such that the above estimate produces a null in the INS Kalman filter 21 observations involving ZUPTs, PDQ, or GPS. Note in the above that the main Kalman filter is using TCS values. These TCS values were initialized from EE-PROM 29 values at turn-on, and have propagated with time from turn-on. However, any TCS Kalman filter 25 updates applied during the current mission are not included. The TCS current-mission updates only affect the new TCS states X__nx and X__ny, as shown below.

Non-zero values of b__xK and b__yK indicates that the INS 1 operational program has determined that X__x and X__y are still in error. The TCS 3 Kalman filter 25 attempts to reduce the errors in X__x and X__y by means of an observation obtained from the INS 1 operational program.

The observations that INS 1 passes to the TCS Kalman filter 25 are $$Z\_x = b\_nx - b\_xKSAVE$$

$$Z\_y = b\_ny - b\_yKSAVE$$

here b__xKSAVE is the INS Kalman filter 21 bias b__xK, saved at the appropriate TCS pass nd b__nx is the total new bias due to new state X__nx defined by $$b\_nx = HD\, X\_nx$$

where HD is the appropriately delayed TCS Kalman filter 21 observation matrix defined below. Similar equations can be specified for the y-axis quantities.

The equations for Z__x and Z__y compare the old and new state variable values and uses the differences in an attempt to achieve a null on Z__x and Z__y by passing the differences as observations to the TCS Kalman filter 21. The TCS Kalman filter update will adjust the TCS states X__nx and X__ny to eventually null Z__x and Z__y.

The TCS x-axis observation matrix places a1 in the a0 state variable slot, T-27 in the a1 state variable slot, and linearly interpolates between the two bin states surrounding the current temperature. The TCS y-axis observation matrix is identical.

The TCS observation matrix H(i), i=1 to 23, contains the sensitivity of the measurement to changes in the 23 TCS Kalman filter 25 state variables. The first 19 state variables are temperature bin variables, the temperature bins being defined by their lower edges TEDGE(i), i=1 to 19, where $TEDGE(i)=3i-3; i=1$ to 19

The current temperature T must fall into one of the following five categories:

1. T<TEDGE(1)−3
2. TEDGE(1)−3<T<TEDGE(1)
3. TEDGE(L)≦T<TEDGE(19)
4. TEDGE(19)<T≦TEDGE(19)+3
5. TEDGE(19)+3<T though it is not expected that T will fall outside the bin range 0 to 54° C., to be safe, the software is designed to handle any temperature. Thus, the logic considers all possible values for T.

For category 1 or 5:
H(i)=0 for i=1–19 [all zero]
H(20)=1 [a0]
H(21)=T-27 [a1] (−27 to +27)
H(22)=0 [a0d] (not directly observed)]
H(23)=0 [a1d] (not directly observed))
For category 2:
H(1)=[T-(−3)]/3 [linear extrapolation to 0]
H(i)=0 for i=2–19 [all zero]
H(20)=1 [a0]
H(21)=T-27 [a1] (−27 to +27)
H(22)=0 [a0d] (not directly observed)]
H(23)=0 [a1d] (not directly observed))
For category 4:
H(19)=[T-(−3)]/3 [linear extrapolation to 0]
H(i)=0 for i=1–18 [all zero]
H(20)=1 [a0]
H(21)=T-27 [a1] (−27 to +27)
H(22)=0 [a0d] (not directly observed)]
H(23)=0 [a1d] (not directly observed))
For category 3, there must be a unique I (I=1 to 19) such that T will satisfy $TEDGE(I)<T\leq TEDGE(I+1)$ [T is within 2 bins]

For category 3:
H(I)=[TEDGE(I+1)-T]/3 [linear extrapolation 1 to 0]
H(I+1)=[T-TEDGE(I)]/3 [linear extrapolation 0 to 1]
H(i)=0 for i=1–19, i≠I, I+1 [all zero]
H(20)=1 [a0]
H(21)=T-27 [a1] (−27 to +27)
H(22)=0 [a0d] (not directly observed)]
H(23)=0 [a1d] (not directly observed))

In words, for i=1 to 19, H(i) linearly interpolates between the two nearest bin state variables if T is within the total range 0 to 54. The value is 1.0 when directly on a bin. Within 3° outside the range, the value at the end of the range is linearly extrapolated to zero. For more than 3° outside the range, H(i) is zero for all i=1 to 19.

Note that although the H matrix elements for states 1–19 go to zero when 3 or more degrees outside the range 0 to 54 deg C, states 20 and 21 (a0 and a1) are alive any T. Note that a1 swings about the center temperature of 27° C. Note that H(22) and H(23) are always zero because add and aid are not directly observed.

The (nondelayed) TCS observation matrix H described above is used for applying current TCS states X__x and X__y to the INS Kalman filter 21 for the present flight. The delayed observation matrix HD is used by the TCS Kalman filter 25 to correct X__nx and X__ny. TCS updates occur in five modes and each of the five modes has it's own time delay-a number that depends upon how far back in time the measurement was effectively taken.

| TCS UPDATE MODE | TIME DELAY |
| --- | --- |
| 1. Real Time updates (ground) | Δt = −9 minutes |
| 2. Real Time updates (air) | Δt = −15 minutes |
| 3. Delayed Extended align updates | Δt = −(present − save + 9 minutes) |
| 4. EE-PROM recovery from ground updates | Δt = −9 minutes |
| 5. EE-PROM recovery from air updates | Δt = −15 minutes |

Also associated with each mode is the appropriate temperature T to be used.

Depending upon the mode, the appropriate time Δt and temperature T is picked up, and passed to the HD subroutine as follows:

Given T, compute H as function of T by calling the H function with T as the argument;

Given Δt, compute Φ as a function of Δt by calling the Φ function with Δt as the argument.

Given H and Φ above, compute HD=HΦ.

The standard Kalman gain equation for K (23×1) is used:

$K=PH^t/D$ where P and H have previously been defined, and D is a scalar given by $D=HPH^t+R$ where R (0.01 deg/hr)² is the TCS Kalman filter 25 observation noise variance scalar.

The TCS Kalman filter 25 state variable error estmates are given by $\Delta X\_nx(i)=K(i)*Z\_x(i=1$ to 23)

$\Delta x\_ny(i)=K(i)*Z\_y(i=1$ to 23)

The TCS Kalman filter 25 corrections to state variables are given by $X\_nx(i)=X\_nx(i)-X\_nx(i)$ (i=1 to 23)

$X\_ny(i)=X\_ny(i)-X\_ny(i)$ (i=1 to 23)

The standard Kalman update equation is used to update the TCS Kalman filter 25 covariance matrix:

$$P=P-KHP$$

which may also be put in the form $$P(ij)=P(ij)-K(i)*K(j)*D$$

The TCS Kalman filter 25 propagation interval is approximately 0.002083 days (exactly 180 seconds). An update will be performed for each propagation interval provided the requirements for TCS update have been met. The equations have been shown with time scaled in units of days where 1 day=24 hours=86,400 seconds, and where all time is understood to be operating time.

For each update time there are two TCS updates: the x-gyro bias observation and the y-gyro bias observation. There are 23 state variables for x-gyro bias observation and 23 state variables for y-gyro bias observation. However, there is only one covariance matrix P (23×23), one observation matrix H (1×23), one measurement noise scalar R, and one gain matrix K (23×1), all of which are used for both x and y axes. The same covariance matrix, observation matrix, measurement noise scalar, and gain matix may be used for both axes because the TCS x and y measurements will only be used when they are "symmetric". The term "symmetric" will be defined later.

The TCS 3 observes the INS Kalman filter 21 x- and y-gyro bias variables and notes the temperature at which this observation occurred. The observed temperature is used by the TCS observation matrix to set the two non-zero bin states surrounding this observed temperature. To account for delay in the INS Kalman filter 21 estimate, the TCS 3 associates the current INS Kalman filter 21 estimate with a gyro bias existing 9 or 15 minutes ago, depending on the mode, and the temperature existing at that time. A delay buffer is used to delay the temperature, and the TCS Kalman filter 25 transition matrix is propagated back from its present value at the current time by this time delay before taking this delayed observation.

The TCS Kalman filter 25 is only allowed to perform updates after the validity check unit 35 has determined that certain stringent validity conditions have been met:

First motion has occurred;

More than 20 minutes from turn-on (to allow thermal transients to die out);

No extended-alignment delayed updates pending (see below for definition of extended-alignment delayed updates);

INS Kalman filter 21 azimuth error small (<1 arcmin) to minimize x and y axis coupling in TCS state variables;

Enough ZUPTs or GPS updates in INS Kalman filter 21 over last 9 or 15 minutes.

Pass 3-sigma TCS 3 observation test.

After power-up the aircraft remains stationary with the INS Kalman filter 21 performing ZUPTs, until alignment is complete and the aircraft may move. However, the aircraft may optionally remain parked for an extended period of time after alignment is complete with ZUPTs continuing, and during this extended time temperature may change. The goal is to allow TCS 3 the opportunity to observe the INS Kalman filter gyro bias estimates obtained from these ZUPTs. However, TCS 3 will not be allowed to take observations because, without a heading change, the east gyro bias is contaminated by azimuth error and the TCS Kalman filter 25 has no heading state variable to accommodate this error. To circumvent this problem the extended-alignment-delayed TCS update mode was mechanized.

During the extended alignment the INS Kalman filter 21 x- and y-gyro bias estimates and temperature are saved in a table by TCS 3 but no TCS updates are allowed yet. Later in the mission, after the aircraft changes heading and stops again for ZUPTs, or receives GPS updates, the INS Kalman filter 21 azimuth covariance may drop to below the required threshold of 1 arcmin. At this point the INS Kalman filter 21 has reduced the heading error to an acceptable value for use by TCS 3. In addition, the heading error that existed in the past during extended alignment at the first heading may be estimated by adding all azimuth corrections from the INS Kalman filter 21 since the end of extended alignment to the present. With the heading error now known, its effect may be removed from the table of x- and y-gyro bias readings saved in the table during extended alignment. The corrected table is then passed to TCS 3 which performs an update for each table entry in a batch-mode loop. The result is that the TCS Kalman filter 25 states X_nx and X_ny are updated using data collected during the extended alignment period but not contaminated by the heading error that existed during the extended alignment period.

In more detail, after turn-on the system may remain parked without motion for an extended period of time, perhaps an hour or two, and will continue aligning from ZUPTs (with GPS updates also possible). During this time the system may experience a temperature change and we would like to update the TCS 3 temperature model bins with this data. We do not wish to be contaminated by the turn-on thermal transient which may exist for up to 20 minutes after turn-on. Thus, the first 20 minutes of data is not used by TCS 3. For times>20 minutes after turn-on, the data is considered free from thermal transients, has been available long enough for the Kalman filter 21 to measure tilt rate, and represents valid data to update the TCS 3 temperature model bins. However, since there has been no heading change, the single heading azimuth alignment error from Kalman filter 21 still contaminates the gyro bias estimates from Kalman filter 21.

Since the gyro bias measurements cannot yet be used by TCS 3 (it has no heading state variable) the x- and y-gyro bias measurements and the current temperature T are simply recorded (every 180 seconds) in RAM. An upper limit of 48 stores will be allowed to cover 2 hours after the first 20 minutes from turn-on. Upon first motion the storing ceases.

Later in the mission, if the heading error is reduced to less than 1.0 arc min (square root of Kalman filter 21 covariance estimate) and some extended alignment data has been saved, then the TCS 3 program logic will direct delayed TCS 3 updates to occur. If the system is shut down before less than 1.0 arc min have been achieved but some extended alignment data has been saved, then the TCS program logic will direct the Type II EE-PROM Buffer to record this situation, so that a TCS minibias procedure (see below) will be performed at the next turn-on.

Typical scenarios which might appropriately reduce the heading error are: after first motion, (1) the vehicle stops at another heading and performs ZUPTs, or (2) performs PDQ updates while taxiing and turning, or (3) performs GPS updates on the ground or in the air. Kalman filter 21 will tend to reduce azimuth covariance in these scenarios.

If the heading error is now eliminated (or made small enough) by Kalman filter 21, then the heading error that existed during the single-heading extended alignment is now known, and its effect may be subtracted from the x- and y-gyro bias readings recorded during the single-heading extended alignment. These adjusted readings are then passed to Kalman filter 25 which does a series of delayed updates (an x and a y update for each stored data point).

To avoid having these delayed updates (there could be as many as 48) compete with current updates with valid GPS or ZUPTS, it is mandated that the delayed updates, if any, must be processed before any current updates may begin.

The specific requirements to save data for possible later use in extended alignment delayed updates are all of the following:

1. First motion has not occurred;
2. The system has been running from turn-on for more than 20 minutes and less than 2 hours 20 minutes;
3. ZUPT mode has not been inhibited;

If these requirements have been met, extended alignment data is saved in a table every 3 minutes. The following quantities are saved in a table for each 3-minute epoch:

b_xK current Kalman filter 21 x-gyro bias state;
b_yK current Kalman filter 21 y-gyro bias state;
T current temperature;
t current time;
ISAVE ast entry of the table pointer ISAVE;
SΔΘz accumulation of Kalman filter 21 azimuth corrections through this epoch.

All values of the above quantities freeze when the requirements for delayed update storage are no longer met (e.g. at first motion).

The specific requirements for delayed updates are all of the following:

1. At least one epoch of x and y measurements have been saved during the initial alignment for this mission. This means the system had been at rest for >20 minutes from turn-on;
2. The present value of the square root of azimuth covariance (from Kalman filter 21) is <1.0 arcmin;
3. It is not more than 5 hours from turn-on;
4. First motion has occurred;
5. SΔΘz being saved has not moved too much;
6. For the index being considered, a 0.05 deg/hr tolerance test on TCS 3 observation error is passed;
7. The TD (delayed temperature to be used for a particular update) is within the range 0<TD<54° C.;
8. It has been at least 29 minutes from turn-on. (This restriction occurs automatically within delayed update processing since the first bin processed is 4).

Assume that at some time later in the mission after first motion that Kalman filter 21 azimuth covariance is small. This suggests that the current azimuth error itself is small. Consequently, the azimuth error existing during the extended alignment before first motion must be approximately equal to the change in the total amount of azimuth corrections applied by Kalman filter 21 since just before first motion, until now. This difference is obtained by subtracting SΔΘzSAVE (the current sum of az corrections) from SΔΘzSAVESAVE (the last extended align saved sum just before first motion).

−φ_z0=SΔΘz SAVESAVE−SΔΘzSAVE

The effect of φ_z0 is removed from the saved data by the correction terms

−φ_z0 Ω_nSAVESAVE sin(HEAD0SAVESAVE) for x+ φ_z0 Ω_nSAVESAVE cos(HEAD0SAVESAVE) for y where HEAD0SAVESAVE is the aircraft heading (clockwise from north) saved at the last extended alignment data save and Ω_nSAVESAVE is north earth rate saved at the same time.

The use of the above correction terms is described below.

Extended-alignment delayed Kalman filter 25 update processing is similar to real-time update processing except the H matrix is adjusted for the time and temperature indicated by the saved data. When the criteria for extended-alignment delayed update processing has been met, all data saved during the extended alignment is processed sequentially. Note that any current Kalman filter 25 updates will not be allowed until all pending delayed Kalman filter 25 updates have been performed. The delayed processing involves only update equations and not propagate equations because the present states and covariances represent the current time—not the past time. Only the measurements represent data from the past. The processing required for this mixture of current and past data is to alter the observation matrix H to point to the past, both in time and in temperature. In addition, the correction for φ_z0 must be applied.

Let ISAVE be the total number of 3-minute epochs saved during extended alignment.

The delayed update logic will process each epoch N from N=4 to N=ISAVE. The first 3 epochs, amounting to 9 minutes of time, are not processed because the time constant for ground Kalman filter 21 processing is approximately 9 minutes.

Each epoch saved during extended alignment contains the Kalman filter 21 x- and y-gyro bias, the temperature, and the time. The gyro biases saved are the values current at the time of save, but because of the Kalman filter time constant, actually represents data from 9 minutes prior to the save. The temperature saved is the value current at the time of save, but because of the Kalman time constant, we need the temperature 9 minutes before this which is found in the table 3 positions to the left. The time saved is the value current at the time of save, but because of the Kalman time constant, we increase the delay by 9 minutes.

At the end of the extended-alignment delayed update batch processing, the states X_nx, X_ny and covariances reflect the current states and covariances after accounting for the information obtained from the old measurements.

If extended-alignment data has been saved, but TCS 3 has not yet processed it (possibly because the INS Kalman filter 21 azimuth covariance is still large), and the system is powered down in this situation, a flag (TCS minibias request) will be stored in EE-PROM 29 along with the last extended-alignment bias measurements. Upon subsequent turn-on, the flag will be noted and a TCS minibias process will be performed during the turn-on initialization. A fixed portion (one-quarter being the preferred value at the present time) of the saved measurement will be used to increment the TCS a0_x and a0_y state variable values. No other TCS values will be changed, and no TCS covariances will be changed. This correction does not have heading error removed and thus is effectively equivalent to the minibias scheme that was employed in the LN-100 prior to the TCS invention.

The TCS minibias process will occur upon turn-on initialization if the Type II EE-PROM buffer shows UPFLAGTYPE=4 in the last slot to be used for turn-on recovery (NMAX). In this situation, the b_xK and b_yK in the indicated slot contains the last saved extended-alignment Kalman filter 21 biases from the previous mission. The UPFLAGTYPE=4 also indicates that, in addition to the fact that previous mission stored some extended alignment data (ISAVE>0), it is also true that the previous mission never used the extended alignment saved data because azimuth covariance never dropped low enough during the flight.

In this situation we wish to recover some of the usefulness of the stored data. The compromise is to alter the TCS biases by predetermined amounts based only on the final entry of extended-alignment stored biases without adjusting the TCS covariances. In this sense, the TCS minibias is analogous to the INS minibias, hence the name. Note however that TCS 3 never changes any INS minibias, and the INS operating program itself is inhibited (with TCS software installed) from changing the two gyro minibiases in instrument frame that correspond to the body x and body y axes. The TCS minibias function changes locations X_nx(20) and X_ny (20) which are in body frame.

Since it is not optimum to update TCS biases without a corresponding update to TCS covariances, one option considered was to not allow any TCS minibias ever. However, experience has shown that the before-TCS the LN100 software minibias scheme of taking a fraction of the x- and y-gyro bias readings as incremental minibiases without regard to heading or heading error tends to converge to the right value over several turn-ons at different headings.

The equations for updating TCS biases, when the TCS minibias logic passes is:

$$X\_nx(20) = X\_nx(20) + K\_mini \; b\_xKII(NMAX)$$

$$X\_ny(20) = X\_ny(20) + K\_mini \; b\_yKII(NMAX)$$

where b_xKII(NMAX), b_yKII(NMAX) are the LAST extended alignment biases saved in EE-PROM Type II from the last mission. (These saved values have already been rotated from instrument to body frame.) X_nx(20), X_ny (20) are the effective a0 being adjusted, and K_mini=¼. If the slot of the Type II buffer end (indicated by NMAX) is zero, but UPFLAGTYPE(0)=4, then only the TCS minibias process is performed.

If NMAX is non-zero, it must have a value 1 through 19. In this case all propagate/update recovery logic is performed on all slots 1 thru NMAX. Then, if UPFLAGTYPE (NMAX)=4, the TCS minibias process is performed only once.

TCS 3 updates occur after TCS propagates (every 180 seconds) provided certain conditions are met. The basic idea is to only do TCS updates after azimuth error has been made small by the INS Kalman filter 21. This may happen due to parking at different headings with ZUPTS, appropriate taxi with PDQ, or appropriate turns with GPS. With heading error small, the INS Kalman filter 25 is directly measuring x- and y-gyro bias without much contamination from heading error.

In addition to small azimuth covariance, it is also required that the INS Kalman filter 21 has had quality observations over the recent past. These observations should be symmetric with respect to the x and y axes because the TCS gains apply to both axes. The requirement for symmetric observations excludes using current PDQ (only) measurements for the current TCS updates because PDQ only observes cross-body measurements. "Almost solid" GPS for the past 15 minutes (with or without PDQ) will satisfy the quality requirement. "Almost solid" ZUPTS will also satisfy the quality requirement. There is no additional specific requirement on the dynamics of the recent past, (such as a history of small pitch, roll, and heading changes) since it is assumed that the INS Kalman filter 21 does not experience any "unwanted" transients during dynamics.

More specifically, TCS updates will occur after TCS propagates (every 180 seconds) provided the following criteria are met:

1. First-motion has occurred;
2. >20 minutes from turn-on;
3. No delayed updates pending;
4. Square root of azimuth covariance (from INS Kalman filter 21)<1 aremin;
5. Of the possible 225 4-second operational program epochs over the past 15 minutes, at least 180 (80%) must be "quality GPS update epoch" or "quality ZUPT update epoch" or both if currently in the AIR mode;
6. Of the possible 135 4-second operational program epochs over the past 9 minutes, at least 108 (80%) must be "quality GPS update epoch" or "quality ZUPT update epoch" or both if currently in the GROUND mode;
7. Absolute TCS observation error<0.05 deg/hr; (This implies that both x and y data must pass or else no update occurs to either. This rule is required because only one set of gains is used for both axes. It makes sense physically since an extra large error in either axis suggests a blunder somewhere, so it is safer to do nothing.)
8. 0<T<54° C.;
9. There has been no change between AIR/GROUND mode for 9 minutes.

With regard to criterion 5 above, the INS Kalman filter 21 does updates every 4 seconds, if allowed by the INS 1 operational program. These updates may be of type ZUPT, PDQ, and/or GPS. GPS updates are further subdivided into GPS updates in C/A code mode or in P(Y) code mode. Each of these is further divided into LOS delta-range, LOS pseudo-range, PVT x,y,z velocity, and PVT x,y,z position.

A "quality GPS update epoch" is defined as an epoch with INS Kalman filter 21 GPS updates with (1) LOS delta-range update while tracking P(Y) code from at least 4 satellites, there being no requirement for LOS pseudo-range update, or (2) PVT velocity x,y,z update while tracking P(Y) code, there being no requirement for a PVT position update.

A "quality ZUPT epoch" is defined as an epoch with INS Kalman filter 21 ZUPT updates on all 3 axes (the INS Kalman filter 21 may already be all 3 axes or nothing for ZUPTs). Note that the INS 1 operational program must actually perform the update to count (e.g. if the operational program three-sigma test rejects the update it must not be counted). From the above we conclude: PDQ updates (cross- and up-body while taxiing) alone do not count toward quality updates. Any GPS update using C/A code (rather than P(Y) code) does not count toward quality updates.

During the current mission, the current state X, the new state Xn, and covariances for the TCS Kalman filter 25 must be stored in EE-PROM 29 so they will be available at next turn-on to initialize Kalman filter 25 for the new mission to the values at the end of the previous mission. EE-PROM is severely limited in three areas:

1. The number of bytes available is limited;
2. Storage into EE-PROM is slow;
3. EE-PROM "wears-out". That is, any particular EE-PROM memory address is only specified to accept 10,000 writes before failure.

These three limitations have been addressed in the TCS 3 mechanization as follows:

Once the shut-down command has been given (by the operator turning the CDU switch to OFF or by directly disconnecting the power source), there is not enough time to store all the required Kalman filter 25 values. Consequently, Kalman filter 25 values must be stored prior to shut-down at certain special non-shut-down moments and/or at a predetermined time interval.

All Kalman filter 25 data is stored in EE-PROM 29 at least once per hour. To obtain the ability to effectively save data to the nearest 3 minutes without actually storing all data every 3 minutes, only partial Kalman filter 25 data is stored every 3 minutes in a 20 slot moving buffer. The 3-minute data is a record of up to 20 slots, of the last one-hour record of updates and measurements. With this data it is possible, at the next turn-on, to recover from EE-PROM 29 the complete state and covariances data of the last full one hour record, and a record of updates since that time, and exactly reconstruct the effect of all updates (up to 20 at an interval of 3 minutes over the last hour) that occurred during the previous flight and that did not have the opportunity to be recorded in the 1 hour file. In this manner the turn-on logic of TCS 3 can recover the last flight's data to a resolution of less than 3 minutes and this resolution is accomplished without storing into any single EE-PROM location more often than once per hour.

Since the operator may shut down at any time, it is possible that shut-down happens to occur during a TCS EE-PROM 29 store (either the full store or the 3-minute store). Since not enough time exists to complete the store, the stored data is potentially (but not guaranteed) in error. To circumvent a possible unrecoverable storage error, during a store to EE-PROM 29, a backup (duplicate) file for most TCS data is also recorded immediately following the primary store. If power goes off during the write, only one of the two (original or backup) is potentially in error. Upon turn-on for the next mission, TCS 3 reads all TSC 3 data from EE-PROM 29, examines checksum errors and other flag contents, and logically determines which EE-PROM 29 files are valid to initialize TCS.

At the completion of the logic above, TCS RAM working values have been initialized from valid buffers. This puts the TCS working values at the last full store of the previous mission, with the 20-element buffer indicating any 3-minute updates that occurred past this point on the previous flight. The next step is to recover up to the last one hour of propagation/updates indicated by the 20-element buffer. These updates are performed sequentially in a batch loop, using the same update algorithms as used by TCS Kalman filter 25 for current updates. At the end, the X and X_n model vectors are added, X_n is zeroed, and the new X and new covariances are stored to EE-PROM 29, and TCS 3 is now ready to proceed with the current mission.

It may happen that the system is turned off almost immediately after turn-on such that the TCS 3 turn-on recovery process just happens to be storing into EE-PROM 29. Recovery from this condition is even more difficult because the data stored in EE-PROM 29 may already be bad, and we may end up with two buffers bad. The status word in high-priority EE-PROM shut-down will indicate this situation, and the subsequent turn-on logic attempts to recover, but defaults if necessary to the worst case of recovering only the old and new states and covariance diagonals, but no 3-minute data, and with off-diagonals set to zero.

The INS 1 operational program stores data into EE-PROM 29 during normal (non-shut-down) system operation when certain requirements have been met and stores a limited amount of data at shut-down using a very high priority loop for both the INS 1 and the TCS 3.

At certain times during the mission and also at shut-down, the INS 1 operational program stores INS 1 minibias estimates in EE-PROM 29. As discussed previously, the INS 1 minibias scheme (prior to the incorporation of TCS 3) will be retained except x- and y-gyro minibiases will not be allowed to change from their final laboratory calibration values. Thus all minibiases except x- and y-gyro minibiases will be allowed to change provided certain conditions are met.

TCS 3 storage into EE-PROM 29 during normal mission operation occurs at various times during the mission and is in addition to the INS 1 storage. Three types of buffers are defined, each with its own chksum:

| Buffer Type | Variables |
|---|---|
| IA | covariance diagonals P(i,i), X_x, X_y, Xn_x, X_ny, 1HRCOUNTER, chksum. |
| IB | correlation coefficients (lower triangle) p(i,j), 1HRCOUNTER, chksum. |
| II | b_xKSAVE(i), b_yKSAVE(i), TD(i), UPFLAGTYPE, chksum. |

Type IA and IB have 1 checksum each. Type II has 20 checksums (one for each slot).

The 8 bit word UPFLAGTYPE(1) is defined as follows:

| Entire Word | Bit | Flag |
|---|---|---|
| msb | 7 | spare |
|  | 6 | spare |
|  | 5 | spare |
|  | 4 | spare |
|  | 3 | UPFLAGTYPE msb |
|  | 2 | ... |
|  | 1 | UPFLAGTYPE lsb |
|  | 0 | spare |

The 3 bits (bit 3,2,1) have the meaning:

| Bit3 | Bit2 | Bit1 | |
|---|---|---|---|
| 0 | 0 | 0 | = 0 = no propagate/update/mini |
| 0 | 0 | 1 | = 1 = propagate |
| 0 | 1 | 0 | = 2 = propagate and update with 9 minute delay |
| 0 | 1 | 1 | = 3 = propagate and update with 15 minute delay |
| 1 | 0 | 0 | = 4 = propagate. Do minibias if last slot |
| 1 | 0 | 1 | = 5 = spare |
| 1 | 1 | 0 | = 6 = spare |
| 1 | 1 | 1 | = 7 = spare |

There is no planned integrity check of these values, since there have been integrity checks limiting the update capability of TCS 3. However, it would be preferable to introduce a final integrity check.

The 23×23 TCS Kalman filter 25 covariance matrix P is stored in two parts. The diagonals are stored in TYPE IA floated since it is difficult to pick a fixed-point scaling due to large dynamic range. The off diagonals (lower triangle only) are stored as fixed-point correlation coefficients in Type IB. The definition of p is $$\rho(i,j) = P(i,j)/sqrt[P(i,i)*P(j,j)]$$

Upon subsequent turn-on, the operational program reinitializes P by first retrieving the diagonals and then retrieving the correlation coefficients and computing $$P(i,j) = \rho(i,j)*sqrt[P(i,i)*P(j,j)]$$

The states X_x, X_y being applied and the new states X_nx, Xny are stored in Type IA. At next turn-on, the turn-on initialization logic will propagate/update as required, add the old and new, and restore the final initialized values back into EE-PROM 29.

The requirements for propagate/update of the data saved in Type II are defined below. The definition of the variables is:

b_xKSAVE—INS Kalman filter 21 state variable rotated into x body axis The store logic saves either the current mission value or the last extended alignment value (for TCS 3 minibias).

b_YKSAVE—INS Kalman filter 21 state variable rotated into y body axis. The store logic saves either the current mission value or the last extended alignment value (for TCS minibias).

TD—appropriately delayed temperature to go with the stored INS Kalman filter 21 state variables. (Note: in the case where the last extended alignment bias has been stored for TCS 3 minibias at next turn-on, the temperature is immaterial since temperature is not used for the TCS minibias mode.)

UPFLAGTYPE—flag showing the type of update required upon turn-on.

A backup (non-shadow, and including its own chksum) is also saved in EE-PROM 29 for Types IA and II but not IB.

Data associated with all three buffer types (and their backups, if any) are stored at the following events:

1. Upon completion of turn-on recovery initialization;
2. Upon completion of extended-alignment delayed updates;
3. Upon landing;
4. Every 20th TCS pass (every hour). Note: events 1, 2, 3, or 4 reset this counter.

If more than 1 of the 4 possible events occur on the same 3-minute TCS pass, the store only occurs once this pass (not once per event this pass). For the above 4 events, the store into the Type II buffer simply sets the Type II buffer to indicate it contains no current 3-minute data.

In addition to the above 4 events, Type II storage occurs every 3 minutes (ie every TCS pass). If this storage coincides with an event 1 thru 4, it has already been included in the discussion above for events 1 thru 4. If this storage does not coincide with an event 1 thru 4, only Type II storage will occur (Types IA and IB will not). In this case, the data stored in Type II will show the TCS update type that occurred for this TCS pass. This data will be used at the next turn-on to recreate the full covariance matrix and states that occurred in real time this flight but that did not get stored in EE-PROM 29 under events 1 thru 4. The purpose of this indirect approach is to avoid storing everything every 3 minutes, which would tend to quickly "wearout" the EE-PROM. At the next turn-on, TCS 3 can exactly recreate all TCS processing that occurred on this mission after the last full store.

Upon recognition of pending immediate shut-down (power switch off or power plug pulled) the INS 1 operating program is interrupted at high priority to perform some panic store to EE-PROM 29. In addition to the usual INS 1 variables, a TCS 3 variable EEWRITESTAT is stored. The variable EEWRITESTAT is a packed word containing 3 parts: PART1—current non-shut-down TCS 3 writing status to EE-PROM 29 when the shut-down command interrupts this write (Note: TCS 3 turn-on recovery logic will use this status (values 1 thrrough 5) to determine how to initialize RAM from EE-PROM 29 at the next turn-on); PART2—pointer (i.e counter) indicating how many 3-minute intervals (up to 19) past the last full store have occurred; and PART3—one-hour counter (i.e. full-store counter) used to test agreement with the one-hour counters stored in TCS 3 non-shut-down EE-PROM 29 Type IA, IIB, and IA backup buffers.

The system power is maintained long enough so that the shut-down write to EE-PROM 29 is always guaranteed to have enough time to reliably complete its write (and shadow write). The time allowed for shut-down includes an allowance for the possibility that a non-shut-down write to EE-PROM 29 may happen to be in progress when a shut-down write is requested. If the completion of the non-shut-down write would not allow enough time for the shut-down write to complete, the software interrupts the non-shut-down write in progress.

Non-shut-down storage of data to EE-PROM 29 happens at events described above. Prior to each storage action, TCS 3 computes the values to be stored in EE-PROM 29, sets these values into RAM buffers, logically determines the RAM value of EEWRITESTAT to be used from the time that storage to EE-PROM 29 is requested until storage to EE-PROM 29 is complete, and the order of buffer storage.

Upon turn-on, the EE-PROM 29 value of EEWRITESTAT is copied into RAM. This value of EEWRITESTAT is a record of the condition of the previous mission's write to EE-PROM 29. It is used during a turn-on in two ways: (1) to determine how to recover the 5 buffers in EE-PROM 29; and (2) to determine the order to store the 5 buffers back into EE-PROM 29. In addition, just before a non-shut-down storage to EE-PROM 29, the value of EEWRITESTAT is altered from its turn-on value to indicate the status of the present storage action.

Following turn-on initialization and any propagate/update or minibias required, the TCS 3 working RAM has the latest values for P. X_x, X_y, X_nx, X_ny, and 1HRCOUNTER. Since at this point all pending propagates, updates, and TCS minibias have been completed, the TCS 3 working RAM value for UPFLAGTYPE is zero. The checksum for each of the buffers is computed and stored. m The RAM buffers image of EE-PROM 29 buffers are then loaded from working TCS 3 RAM values in accordance with a specified format. To store the RAM buffers in EE-PROM 29, the order of the store must be logically determined so that the store will be compatible with the turn-on logic analysis of checksum errors. This order is a function of the turn-on value of EEWRITESTAT and turn-on checksum fails. In addition, during the store to EE-PROM 29 the RAM value of EEWRITESTAT is set to identify the status of the present store to EE-PROM 29 for use at next turn-on.

At this point TCS 3 has already read (at turn-on) the packed word EEWRITESTAT(EE) from EE-PROM 29 into the RAM packed word EEWRITESTAT(RAM) and unpacked EEWRITESTAT(RAM) into PART1, PART2, and PART3.

PART1 was subsequently stored into the RAM variable RAMSTAT and indicates the status (1 through 5) of writing to EE-PROM 29 when shut-down occurred on the previous mission. RAMSTAT values have the following meanings.
RAMSTAT Value Meaning 1 No TCS 3 store to EE-PROM 29 in progress at shut-down.

2 TCS 3 turn-on initialization store to EE-PROM 29 (with invalid EE) in progress at shut-down.

3 TCS 3 turn-on initialization store to EE-PROM 29 (with valid EE) in progress at shut-down.

4 TCS 3 full mission store to EE-PROM 29 in progress at shut-down.

5 TCS 3 3-minute store to EE-PROM 29 in progress at shut-down.

In addition, the variable RAM3MIN has been set to point to the last safe slot (0 thru 19) in Type II data, and the variable 1HRCOUNTER has been incremented. The turn-on checksums have been evaluated. The variable NFAILS has the count (0 through 5) of the number of buffers IA, IB, II, IAbackup, IIbackup that have a checksum error. The flag IAFAIL has been set to a 1 if IA (primary) buffer had a checksum error.

The store into EE-PROM 29 is a function of RAMSTAT. In addition, just before the store into EE-PROM 29 begins, the packed word EEWRITESTAT(RAM) is set to indicate that storage is in progress so that if power as turned off during this turn-on initialization store, the next turn-on will be able to recover the proper data from EE-PROM 29. Finally the logic to store into EE-PROM 29 takes into account the number of checksum fails. The order of storing to IA Buffer and IA Backup Buffer is reversed depending upon IAFAIL. This logic writes to IA Backup Buffer first if IA Primary is good to prevent destroying IA Primary in case power goes off. At the end of storing to EE-PROM 29, EEWRITESTAT(ram) is reset to show no store in progress.

During a regular mission (not turn-on store, and not shut-down store) a full store (all 5 buffers) to EE-PROM 29 occurs under conditions previously specified. During the regular mission (not turn-on store, and not shut-down store) a full store (all 5 buffers) occurs under conditions defined in par 6.1. A full store involves preparing the TCS working values, preparing the RAM buffers which are an image of the EE-PROM 29 buffers desired, the order of storing the RAM buffer data to EE-PROM 29, and how to set EEWRITESTAT for this store. The first step of the full store is to prepare the TCS 3 working RAM.

When a full store is due during a regular mission (I/hr, completed delayed update, or just landed), the TCS 3 working values have the latest P. $X\_x$, $X\_y$, $X\_nx$, $X\_ny$, 1HRCOUNTER, and UPFLAGTYPE. UPFLAGTYPE will have one of the following values.

| UPFLAGTYPE Value | Meaning |
| --- | --- |
| 1 | Propagate only. |
| 2 | Propagate, update with air delay. |
| 3 | Propagate, update with ground delay. |
| 4 | Propagate if not slot 0, minibias at last slot. |

Just before the full store, change UPFLAGTYPE as follows:
   IF UPFLAGTYPE=4, THEN LEAVE UPFLAGTYPE=4
     (TCS minibias request)
   ELSE, UPFLAGTYPE=0 (Set to zero since nothing to do
     at turn-on)
   END IF
Since this is a full store, UPFLAGEND=0 will go in slot 0. The checksum for each of the buffers is computed.

The next step of the full store involves the preparation of RAM buffers. An image of the data to be loaded into EE-PROM 29 is loaded from working TCS 3 RAM into the RAM buffers. Storing the data in the RAM buffers into EE-PROM 29 must proceed in a particular order to be compatible with the turn-on logic analysis of checksum errors. In addition, during the store to EE-PROM 29, the RAM value of EEWRITESTAT is set to identify the status of the store. At the end of the store, EEWRITESTAT(RAM) is reset to show no store in progress.

During a regular mission a store to EE-PROM 29 occurs every 3 minutes. This store may be a full store (all 5 buffers) as discussed above or a 3-minute store. A 3-minute store only stores 2 buffers (Type II and it's backup), and it occurs at 3-minute intervals that do not coincide with a full store. A 3-minute store involves preparing the TCS working values, preparing the RAM buffer data which are an image of the EE-PROM 29 buffer data desired, the order of storing the RAM buffer data to EE-PROM 29, and how to set EEWRITESTAT for this store.

Preparation of TCS working RAM is accomplished in the following way. When a 3-minute store is due (not a 1-hour completed delayed update, just landed, or turn-on store) during a regular mission, the TCS 3 working values have the latest P, $X\_x$, $X\_y$, $X\_nx$, $X\_ny$, 3MINCOUNTER, 3MINCOUNTERLAST, 1HRCOUNTER, and UPFLAGTYPE. UPFLAGTYPE will have one of the following values.

| Upflagtype | Meaning |
| --- | --- |
| 1 | Propagate only. |
| 2 | Propagate, update with air delay. |
| 3 | Propagate, update with ground delay. |
| 4 | Propagate only; then, if last slot, do TCS minibias. |

The 3MINCOUNTER has been incremented to point to the new slot in Type II buffer. The 3MINCOUNTERLAST points to the last safe slot which is one slot to the left. The checksum for Type II buffer is computed.

Preparation of Type IA primary RAM buffer and Type IB RAM buffer is not needed for 3-minute stores. Preparation of Type II primary RAM buffer requires the following data to be entered into the 3MINUTECOUNTER slot.

If the counter ISAVE contains a non-zero value, then the conditions for potential TCS minibias exist. In this case the last saved extended alignment bias values must be saved in EE-PROM 29. If ISAVE=0, then the last current bias values are saved. The appropriately delayed temperature TD is saved. The pointer to the slot to be written in Type II primary is set equal to 3MINUTECOUNTER since this is a 3-minute store. The UPFLAGTYPE logic will have set UPFLAGTYPE (values 1 through 4) and this value is saved. Finally, the Type II checksum for this slot 3MINCOUNTER is computed and saved.

In all 5 steps above we are only preparing to store in one slot, namely slot 3MINCOUNTER. The other 19 slots are not written (but all 20 slots are written in turn-on initialize as described above).

To store the RAM buffers prepared above to their image in EE-PROM 29, the specified order of the store must be followed to be consistent with the turn-on logic analysis of checksum errors. In addition, during the store the RAM value of EEWRITESTAT is set to identify the status of the present store to EE-PROM 29 (for use at next turn-on).

Although we are storing into slot 3MINCOUNTER of Type II buffer, the 3 minute counter saved in EEWRITESTAT is the last safe pointer 3MINCOUNTERLAST, which might be needed at the next turn on if shut-down occurs during this store. At the end of storing to EE-PROM 29, EEWRITESTAT(RAM) is reset to show no store in progress.

At turn-on TCS 3 must be initialized from the values stored in EE-PROM 29 during the last mission. The value of EEWRITESTAT is recovered from EE-PROM 29, the EE-PROM buffers Type IA Primary, IB, II Primary, IA Backup and II Backup are copied from EE-PROM 29 into RAM buffers and their checksums computed, with any checksum error noted.

The working TCS covariance diagonals P(i,i), current states $X\_x$, $X\_y$, new states $X\_nx$, $X\_ny$, and 1HRCOUNTER are obtained from either RAM buffer IA Primary or IAbackup. The choice will depend upon the value of the recovered EEWRITESTAT as well as checksum fail results. The working TCS correlation coefficients will be obtained from either RAM buffer IB or will be set to zero since there is no backup buffer. The working TCS update recovery table will be obtained from one of three sources: RAM buffer II Primary, RAM buffer II Backup, or set to zero. The off-diagonal covariances are computed from the diagonals and correlation coefficients using the equation $$P(i,j) = \rho(i,j) * sqrt[P(i,i) * P(j,j)]$$

The goal of the initialization logic is to restore TCS states and covariances to their condition at the last full store (all 5 buffers) during the last flight. The logic tries to eliminate bad store to EE-PROM 29 during the last flight that occurred because the system was shut down during a store to EE-PROM 29. This recovery usually will be complete and exact but in some cases will be only partial, but still survivable.

Once TCS 3 has been initialized (or approximately initialized) to the conditions of the last full store on the last flight, the table obtained from Type II data is analyzed to determine if 3-minute propagates and/or updates occurred on the previous flight after the full EE-PROM store. If so, the Type II data contains enough information to reconstruct these propagates/updates to bring the TCS 3 values up to the actual values at shut-down of the last flight. These propagate/updates are performed, and the final results stored back into EE-PROM 29. It is also possible that the Type II data requests a TCSMINIBIAS.

The logic to initialize working TCS values at turn-on from EE-PROM 29 is structured in 3 steps:

STEP1—The EE-PROM values are loaded into RAM, and status and checksums are evaluated;

STEP2—The 5 buffers to use in initializing TCS working values is determined from status and checksums. Four flags (IARECOVERY, IBRECOVERY, IIRECOVERY, SLOTRECOVERY) are set to the appropriate value to pass to the next step;

STEP3—The working TCS values are initialized based on flags set in STEP2.

At turn-on TCS 3 recovers the correct files from EE-PROM 29 and initializes the TCS 3 working variables. At that point, the TCS 3 covariances P, and TCS old and new states X__x, X__y, Xnx, and X__ny have been initialized to the value existing at the last full 1-hour store to EE-PROM 29 on the last flight.

The table extracted from Type II buffer details how to propagate/update/minibias for any 3-minute intervals that occurred on the last flight after a full stores to EE-PROM. The variable UPFLAGTYPE(i), for i=0 to 19, indicates what processing is to be performed. The variable NMAX has been set to the highest value of i to be processed. Thus, NMAX may have the value 0 through 19.

At each slot 1 through NMAX propagates will occur (with a possible update) according to the following value of UPFLAGTYPE in that slot:

UPFLAGTYPE Action
1 3-minute propagate
2 3-minute propagate and update with 9 minute delay
3 3-minute propagate and update with 15 minute delay
4 3-minute propagate If NMAX=0, no update or propagate will occur, but a TCS minibias is possible. There is no distinction between UPFLAGTYPE=1 or 4 for purposes of propagate or update-the distinction is for TCS minibias.

The equations for propagate are similar to the TCS real-time propagate equations.

The equations for update are similar to the TCS real-time update equations. The observation for each slot is obtained from the Type H data table. The observation matrix active elements point to the delayed temperature (to account for INS Kalman filter 21 delay) obtained from the Type II data table. The observation matrix is propagated back by 9 or 15 minutes (to account for INS Kalman filter 21 delay) based upon the UPFLAGTYPE in the Type II data table.

At the end of the 3-minute batch processing above, the states and covariances reflect the values at shut-down of the previous flight. At this point any TCS minibias is applied. Following any TCS minibias application, the old and new states are added, the new states are zeroed, the one-hour counter is incremented, and the 3-minute counter is cleared. Finally, the 5 buffers in EE-PROM 29 are updated.

The INS Kalman filter 21 navigation states are in navigation frame axes. The gyro bias states are in instrument case frame (effective instrument frame) axes. Although the instrument case can be mounted arbitrarily in the aircraft, it is usually mounted at some nominal cardinal rotation from the aircraft body, and this defines a nominal "swap" rotation matrix S from instrument (or case) frame to aircraft body frame.

The TCS 3 is designed to work on the two nominally-level gyro biases. The swap matrix is required to rotate INS Kalman filter bias measurements from case to body when passed to TCS 3 and to rotate TCS bias results used by the INS operational program from body to case.

The swap from case to body occurs at the 3-minute save (45th pass) of the INS Kalman filter 21 4-second loop. The swap from body to case occurs when the total TCS bias to be used by the INS Kalman filter 21 is computed.

The swap matrix S rotates from instrument to body:

| | | | |
|---|---|---|---|
| x__body | | | x__instrument |
| y__body | = | S | y__instrument |
| z__body | | | z__instrument |

Typically, S will be one of two values:

| | | | | | | |
|---|---|---|---|---|---|---|
| | | 1 | 0 | 0 | | |
| S | = | 0 | 1 | 0 | | (called "AFT") |
| | | 0 | 0 | 1 | | |
| | | −1 | 0 | 0 | | |
| S | = | 0 | −1 | 0 | | (called "FORWARD") |
| | | 0 | 0 | 1 | | |

With TCS software engaged, the INS Kalman filter 21 minibias routine will be inhibited from changing two of the three instrument frame gyro minibiases. These two instrument frame minibiases correspond to "level" body frame and are determined as follows:

| | | |
|---|---|---|
| Let: | | |
| x__body | | 1 |
| y__body | = | 1 |
| z__body | | 0 |
| Then find: | | |
| x__inst | | x__body |
| y__inst | = S' | y__body |
| z__inst | | z__body |

From the above it will turn out that two of the three frames x__inst, y__inst, z__inst will compute to +or −1, and the third will compute to zero. The two instrument frames that compute to nonzero correspond to the body frame and these are the two instrument frame minibiases that are to be inhibited from changing when TCS software is engaged.

What is claimed is:

1. A method for compensating for the output error in each of one or more navigation instruments in a system comprising a plurality of navigation instruments, the method being practiced after the system is introduced into its operating environment, the practice of the method continuing for a plurality of time periods, a time period being started and ended by events independent of the timing of method operations, the method comprising the step:

compensating during a present time period for the output error in each of the one or more navigation instruments as a function of temperature utilizing a present second compensation model based on measurements obtained in one or more prior time periods, a future second compensation model for use in the next time period being determined during the present time period, the future second compensation model becoming the present second compensation model at the start of the next time period.

2. The method of claim 1 wherein the future second compensation model is determined from data obtained when the system is subjected to specified types of motion or is supplied with data by other navigation data sources.

3. The method of claim 1 comprising a plurality of steps performed repetitively during a time period, the method comprising the steps:

(a) determining the values of one or more of a set of coordinates that specify the position, velocity, and orientation of the system in space together with the error in the compensated output for each of the one or more navigation instruments utilizing the compensated outputs for the one or more navigation instruments obtained as a result of the prior execution of step (d);

(b) determining a compensation model for each of the one or more navigation instruments, a compensation model specifying for the current time period an adjustment in amplitude of the output of a navigation instrument as a function of time and temperature, a compensation model being the sum of the values of a first compensation model and a present second compensation model, the present second compensation model being the future second compensation model determined during the prior time period;

(c) measuring the time and the temperature of the navigation instruments;

(d) obtaining a compensated output for each of the one or more navigation instruments by adjusting the output of a navigation instrument in accordance with its compensation model.

4. The method of claim 3 wherein step (a) comprises the steps:

(a1) determining the error in the compensated output for each of the one or more navigation instruments during a time period utilizing the future second compensation model being determined during the same time period in step (b).

5. The method of claim 3 wherein the first compensation model is defined in terms of temperature by the product of a first observation matrix and a first model vector, one or more of the components of the first observation matrix being functions of temperature, zero or more of the components of the first model vector being functions of time.

6. The method of claim 5 wherein an operating temperature range is specified for the system, the first compensation model comprising a polynomial in temperature, the components of the first model vector comprising the coefficients of the polynomial.

7. The method of claim 6 wherein the operating temperature range is divided into temperature intervals, the first compensation model also comprising a polynomial in temperature defined for each temperature interval, the components of the first model vector also comprising the coefficients of each temperature interval polynomial.

8. The method of claim 7 wherein the first compensation model also comprises a minibias, the value of the minibias being determined as a result of performing the method.

9. The method of claim 5 wherein step (a) is repeated at specified INS time intervals during a time period, the values of the first compensation model and the present second compensation model being determined for each INS time interval and added together to obtain the value of the compensation model.

10. The method of claim 9 wherein in step (a) the determination of the values for an INS time interval utilize the values determined for the previous INS time interval.

11. The method of claim 10 wherein step (a) corresponds to an iteration of a Kalman filter process called the INS Kalman filter process.

12. The method of claim 11 wherein the state variables for the INS Kalman filter process include the error in the compensated output for each of the one or more navigation instruments.

13. The method of claim 12 wherein step (a) comprises the following step performed upon the occurrence of one or more specified events:

(a1) saving the error in compensated output for each of the one or more navigation instruments, the associated temperature, and a flag identifying the type of update required at the beginning of the next time period.

14. The method of claim 13 wherein a specified event is included in the group (1) the completion of an initialization process at the beginning of a time period, (2) the completion of delayed updates resulting from extended alignment procedures, (3) the transition of the system from motion relative to earth to non-motion, (4) the passage of a specified long time interval since the occurrence of a specified event, and (5) the passage of a short time interval since the occurrence of a specified event.

15. The method of claim 3 wherein the future second compensation model is determined during a time period utilizing the error in the compensated output for each of the one or more navigation instruments determined during the same time period in step (a).

16. The method of claim 3 wherein a second compensation model is defined in terms of temperature by the product of a second observation matrix and a second model vector, one or more of the components of the second observation matrix being functions of temperature, zero or more of the components of the second model vector being fimctions of time, step (b) comprising the steps:

(b1) determining the values of the components of the future second model vector by utilizing the values of the components of the present second model vector and data resulting from the performance of step (a) if one or more criteria are satisfied.

17. The method of claim 16 wherein the second compensation model comprises a polynomial in temperature, the coefficients of the polynomial being approximated by polynomials in time, the components of the second model vector comprising the coefficients of the polynomials in time.

18. The method of claim 17 wherein the coefficient of the highest order term of the polynomial in time is a function of time.

19. The method of claim 17 wherein the operating temperature range is divided into temperature intervals, the second compensation model also comprising a polynomial in temperature for each temperature interval, the components of the second model vector also comprising the coefficients of the polynomials in temperature for each temperature interval.

20. The method of claim 19 wherein one or more of the coefficients of the temperature interval polynomial are functions of time.

21. The method of claim 19 wherein the second compensation model also comprises a minibias under certain specified conditions.

22. The method of claim 16 wherein the error in the compensated output of an instrument is utilized in updating the components of the second model vector to obtain the components of the future second model vector.

23. The method of claim 22 wherein step (a) is repeated at specified INS time intervals and step (b1) is repeated at specified TCS time intervals during a time period, a TCS time interval being equal to or greater than an INS time interval.

24. The method of claim 23 wherein the values of the components of the second model vector for a TCS time interval are used to determine the values of the components for the next TCS time interval.

25. The method of claim 24 wherein step (b1) corresponds to an iteration of a Kalman filter process called the TCS Kalman filter process, the error in the compensated output of an instrument being an observable for the TCS Kalman filter process.

26. The method of claim 25 wherein the state variables for the TCS Kalman filter process include the components of the future second model vector.

27. The method of claim 26 wherein the present second model vector and a corrections vector are separately saved for each TCS Kalman filter process iteration, the future second model vector being the sum of the present second model vector and the corrections vector.

28. The method of claim 27 wherein the future second model vector at the end of a time period becomes the present second model vector at the beginning of the next time period and the corrections vector becomes zero.

29. The method of claim 26 wherein the dynamics matrix for the TCS Kalman filter process is non-zero.

30. The method of claim 26 wherein step (b1) further comprises the following steps performed upon the occurrence of one or more specified events:
(b1a) saving the component values of the present second model vector;
(b1b) saving data from which the component values of the present second model vector for the next time period can be determined.

31. The method of claim 30 wherein the saved data of step (b1b) include the values of the TCS Kalman filter covariance matrix.

32. The method of claim 30 wherein a specified event is one of a group comprising (1) the completion of an initialization process at the beginning of a time period, (2) the completion of delayed updates resulting from extended alignment procedures, (3) the transition of the system from motion relative to earth to non-motion, and (4) the passage of a specified long time interval since the occurrence of a specified event.

33. The method of claim 16 wherein the criteria of step (b") comprise one or more of a group including (1) navigation data obtained from other navigation sources having a quality better than a specified level, (2) navigation data obtained as a result of the system being subjected to specified types of motion having a quality better than a specified level, (3) first motion of the system after the beginning of a time period having occurred, (4) a specified time interval having elapsed after the beginning of a time period, (5) no delayed updates pending, (6) azimuth error being less than a specified value, and (7) errors in the data resulting from the performance of step (a) and utilized in step (b1) being less than specified values.

34. The method of claim 3 wherein step (b) comprises the step:
saving navigation data at end of a time period, the navigation data being data needed to re-establish execution of the method at the beginning of the next time period as a continuation of the method as it was being executed at the end of the time period.

35. The method of claim 3 wherein a second compensation model is defined by the product of a second observation matrix and a second model vector, step (a) being repeated at specified INS time intervals and step (b) being repeated at specified TCS time intervals during a time period, a TCS time interval being equal to or greater than an INS time interval, step (a) corresponding to an iteration of a Kalman filter process called the INS Kalman filter process, step (b) corresponding to an iteration of a Kalman filter process called the TCS Kalman filter process, the error in the compensated output of each of the one or more instruments being a state variable of the INS Kalman filter process and an observable for the TCS Kalman filter process, the state variables for the TCS Kalman filter being the components of the future second model vector, the values of the TCS Kalman filter state variables being saved upon the occurrence of one or more specified events and the values of the INS Kalman filter compensated output error state variables being saved at specified short time intervals.

36. The method of claim 35 wherein step (b) comprises the following steps performed at the end of a time period:
(b1) saving information about any saving steps occurring at the end of the time period;
(b2) saving the number of instances that the INS Kalman filter compensated-output-error state variables were saved after the last save of the TCS Kalman filter state variables.

37. The method of claim 35 wherein step (b) comprises the following steps performed at the end of a time period:
(b1) saving data from which can be derived (1) the component values of the present second model vector and the future second model vector, (2) the TCS Kalman filter covariance matrix element values, (3) the INS Kalman filter compensated-output-error values, and (4) the instrument temperature, the data being saved at time intervals no greater than specified long time intervals during a time period;
(b2) saving data from which can be derived INS Kalman filter compensated-output-error values and instrument temperature value at specified short time intervals following the data saving of step (b1);
(b3) determining the values of the TCS Kalman filter state variables and covariance matrix elements corresponding to the beginning of the next time period utilizing the data saved in steps (b1) and (b2).

38. The method of claim 35 wherein step (b) comprises the following steps:

(b1) saving the value of the INS compensated output error for each of the one or more navigation instruments, the associated temperature, and the associated time beginning after a specified initial delay from the beginning of a time period at short time intervals, offsets being introduced in the compensated output values by uncertainties in the values of one or more INS Kalman filter state variables;

(b2) determining the offsets in the saved compensated-output-error values when the uncertainties in the values of the one or more INS Kalman filter state variables have been reduced to a specified level;

(b3) correcting the saved compensated-output-error values for the offsets of step (b2);

(b4) performing delayed updates of the TCS Kalman filter state variables from the beginning of the time period utilizing the corrected saved compensated-output-error values of step (b3).

39. The method of claim 38 wherein delayed updates of the TCS Kalman filter state variables are executed before current updates may begin, a current update utilizing observable values acquired during the current TCS time interval, a delayed update utilizing observable values acquired prior to the current TCS time interval.

40. The method of claim 38 wherein steps (b1) through (b4) are executed only if one or more conditions are satisfied.

41. The method of claim 35 wherein step (b) comprises the following steps:

(b1) saving the value of the INS compensated output error for each of the one or more navigation instruments, the associated temperature, and the associated time beginning after a specified initial delay from the beginning of a time period at short time intervals, offsets being introduced in the compensated output values by uncertainties in the values of one or more INS Kalman filter state variables;

(b2) adding a fraction of the most recent value of the compensated output error for each of the one or more navigation instruments saved in step (b1) to the present second compensation model at the beginning of a time period if the values of the compensated output errors saved in step (b1) were not used in the prior time period.

42. The method of claim 35 wherein short time intervals are the same as TCS time intervals.

43. The method of claim 3 wherein the plurality of navigation instruments consists of the x-axis gyro and the y-axis gyro, the x axis and the y axis being the nominally level instrument frame axes.

44. The method of claim 3 wherein a time period begins with power-on and ends with power-off of the system.

45. The method of claim 3 wherein time is a measure of the time that a system is in a power-on state.

* * * * *